United States Patent
van den Broek et al.

(10) Patent No.: US 10,289,388 B2
(45) Date of Patent: May 14, 2019

(54) PROCESS VISUALIZATION TOOLKIT

(71) Applicant: Oracle International Corporation, Redwood Shores, CA (US)

(72) Inventors: Hendrik van den Broek, Lexington, MA (US); Chadwick Chow, Foster City, CA (US); Wilson Louie, Somerville, MA (US)

(73) Assignee: Oracle International Corporation, Redwood Shores, CA (US)

( * ) Notice: Subject to any disclaimer, the term of this patent is extended or adjusted under 35 U.S.C. 154(b) by 301 days.

(21) Appl. No.: 15/199,546

(22) Filed: Jun. 30, 2016

(65) Prior Publication Data

US 2018/0004374 A1    Jan. 4, 2018

(51) Int. Cl.
| | |
|---|---|
| G06F 8/34 | (2018.01) |
| G06F 8/20 | (2018.01) |
| G06F 3/0484 | (2013.01) |
| G06F 17/24 | (2006.01) |
| G06T 11/20 | (2006.01) |
| G06F 8/38 | (2018.01) |
| G06Q 10/06 | (2012.01) |
| G06F 8/36 | (2018.01) |
| G06F 9/445 | (2018.01) |

(52) U.S. Cl.
CPC .............. *G06F 8/34* (2013.01); *G06F 3/0484* (2013.01); *G06F 8/20* (2013.01); *G06F 8/38* (2013.01); *G06F 17/248* (2013.01); *G06Q 10/06311* (2013.01); *G06T 11/206* (2013.01); *G06F 8/36* (2013.01); *G06F 9/44505* (2013.01)

(58) Field of Classification Search
None
See application file for complete search history.

(56) References Cited

U.S. PATENT DOCUMENTS

| | | | | |
|---|---|---|---|---|
| 8,302,074 | B1 * | 10/2012 | Waldorf | G06F 17/3089 715/234 |
| 8,347,228 | B1 * | 1/2013 | Kates | G06Q 10/107 345/9 |
| 9,715,556 | B2 * | 7/2017 | Sekharan | G06F 17/30893 |
| 2013/0187926 | A1 * | 7/2013 | Silverstein | G06Q 10/105 345/440 |

* cited by examiner

*Primary Examiner* — Lewis A Bullock, Jr.
*Assistant Examiner* — Mark A Gooray
(74) *Attorney, Agent, or Firm* — Trellis IP Law Group, PC (57) ABSTRACT

A process visualization toolkit includes micro-component templates and application programmer's interfaces (APIs) to build a process visualization and show it in a graphical user interface (GUI) on a computer screen. Micro-components share compatible display properties that relate to process visualization. The APIs allow customization, but also allow mixing micro-components with components in standard technologies, such as HTML. Shared properties include display settings, position settings, time settings, and the time type (calendar time, work time, relative time). A time axis micro-component includes functions to convert time to pixel position, and pixel position to time, based on the time type. Developers add functionality and interactive functions using a standard language such as JavaScript, and may customize display rendering using, for example, cascaded stylesheets.

15 Claims, 7 Drawing Sheets

```
C:\>tracert oracle.com

Tracing route to oracle.com [137.254.120.50]
over a maximum of 30 hops:

1    1 ms    1 ms    1 ms  192.168.0.1
  2    2 ms    2 ms    1 ms  172.27.35.1
  3   13 ms   20 ms   27 ms  dtr0iglryca-tge-0-1-0-2.glry.ca.charter.com [96.34.122.245]
  4   27 ms   27 ms   37 ms  ORACLE-CORP.ear1.SanJose3.Level3.net [4.53.212.54]
  5   66 ms   62 ms   66 ms  vp-ocoma-cms-adc.oracle.com [137.254.120.50]

Trace complete.

PROCESS VISUALIZATION TOOLKIT

BACKGROUND

The present invention is in the area of computer graphical user interfaces (GUIs). It can be used in applications that visualize processes on a computer system display. A process may include multiple process steps or sub-processes, which may be sequential, or partially or fully overlapping. A process visualization may graphically display each of the process steps or sub-processes, along with pertinent information, including duration, performance, and any other information relevant for a user.

One application is in web sites that measure and display system or internet performance. For instance, a message traversing internet may be followed from its source to its destination via multiple intermediate nodes. The time between each two nodes may be a measure for the quality of the link (called a hop) between the two nodes. A web page may display a customized bar graph chart, where each of the successive hops is represented by a horizontal bar. The width of the bar may represent the measured message transfer time. The width of all bars together may represent the total transfer time. Therefore, it may be desired to place bars successively on one row, or on successive rows. It may even be desired to place successive sets of bars on successive rows in a snake-like sequence. Another feature of each bar could carry other pertinent information, for instance the bar color could identify the type of hop. And the height of the bar could, for example, represent the available capacity of the hop, or a measure for its congestion. Additional text labels, icons, shading, shadowing, etc., could represent other relevant information.

Typically, a developer of a website like this would directly write detailed code to define the custom bar graph visualization, heavily relying on hypertext markup language (HTML), cascaded stylesheets (CSS), and some script language, for example JavaScript. Although she or he could purchase a pre-developed bar graph chart component, none that is for sale might meet the exact needs.

A computer software programmer developing software that needs to measure and display system or internet performance faces the same problems. However, he or she may depend on other existing technologies to define the custom bar graph visualization. Many options exist: a Java programmer might work with NetBeans; a C++ programmer might work with Qt or wxWidgets; a C# programmer might prefer XAML, etc.

Another application area is project management. Most project management software, including Oracle's Primavera, Microsoft Project, Smartsheet, OpenProject, and others, have the capability to display a GANTT chart: a type of bar chart adapted to show a project's work breakdown structure. A GANTT chart can also be shown on a web page.

Prepackaged and precompiled software usually provides limited possibilities to configure what is displayed by a GANTT chart. A user of Microsoft Project is limited to the software's built-in options for selecting what to display, and how. A user of open-source software theoretically has the capability to change the software's source code and recompile it. However, this is a cumbersome procedure that may require substantial reverse engineering. Again, a developer may purchase a pre-developed GANTT chart component. But, this is likely to have similar limitations as discussed above.

Yet another area of application is scheduling. Calendar software and pre-developed components are readily available. However, when none meets the exact requirements, a developer may be forced to develop a visualization in all its minute detail.

Unfortunately, for the above and similar cases, developers have been limited to two extremes: either use a predeveloped solution with all its limitations, or develop a process visualization solution from scratch.

SUMMARY

Visualizations are software components (components are also called controls or widgets) used in computer graphical user interfaces (GUIs) to display data, emphasizing some aspects of the data and de-emphasizing other aspects. Visualizations allow data presentation in a perspective that is meaningful for the users, whether these are presenters of the data, or consumers. A process visualization shows at least one aspect of some process. Process visualizations are used in various applications—for example to graphically illustrate a process's performance, schedule, timing, dependencies, influences, causes and results, robustness, strengths, weaknesses, variabilities, or anything else considered relevant to its users.

In a first aspect, embodiments of the present invention provide a developer with methods to create a process visualization with unlimited functionality and rendering options, without having to develop the process visualization from scratch. Embodiments include a process visualization toolkit including one or more process visualization micro-component templates and an application programmer's interface (API) for each micro-component. Using even a single micro-component to build a process visualization will save the developer significant time. Using multiple micro-components will save even more time as they share compatible display properties that can be set without need for conversions.

Each micro-component includes the following: a first display size property, denoting a display size in a first direction; a second display size property, denoting a display size in a second direction; a display scale property, denoting a ratio between the display size in the first direction and a time duration; a start time property; a time duration property; a time type property to indicate a selection of an available time type; a display position property; and one or more shapes to be displayed in the GUI. Time types include calendar time, work time, and relative time.

The API for each micro-component includes functions to show the micro-component, customize rendering of the one or more shapes, update displayed information, and fire an event or a signal upon receiving a user input.

A developer can create a process visualization by: selecting a first micro-component from the toolkit; determining a process visualization default layout including the first micro-component; determining public layout parameters and public non-layout parameters; initializing layout-related and position-related properties to default values of the parameters to create the default layout; adding a function using the API; adding a custom function; creating an object including the default layout, and initializing at least a portion of the layout-related and position-related properties to non-default values; initializing the time type, start time, and time duration properties; and showing the object.

In a second aspect, an embodiment of the invention includes a computer storage medium including one or more process visualization micro-component templates with their respective APIs, and including instructions to retrieve process data; retrieve a process visualization default layout including a first micro-component; create an object including the default layout, and initializing at least a portion of layout-related and position-related properties to non-default values; initialize object time type, start time, and time duration properties based on the retrieved process data; and show the object in a GUI.

In a third aspect, an embodiment of the invention includes a system capable of performing the same method.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which.

DETAILED DESCRIPTION

Process Visualizations

Visualizations are software components (components are also called controls or widgets) used in computer graphical user interfaces (GUIs) to display data on a computer screen, emphasizing some aspects of the data and de-emphasizing other aspects. Visualizations allow data presentation in a perspective that is meaningful for the users, whether they are presenters of the data, or its consumers. An optimized visualization provides a powerful way to make data suited for effective and efficient human interpretation. In many cases it also provides interactivity to change the data itself, or the way the data is shown, or the portion of data shown if not all data is visible at the same time.

A process visualization shows at least one aspect of some process. Process visualizations are used in various applications—for example to graphically illustrate a process's performance, schedule, timing, dependencies, influences, causes and results, robustness, strengths, weaknesses, variabilities, or anything else considered relevant to its users. As another example, they may be used in project management. A GANTT chart is a type of process visualization that is helpful for a project manager to determine when results will be available, what resources are needed, which process steps form a critical path on which the project results schedule is directly dependent, which risks and sensitivities may impact the project outcome, etc. Yet another example of a process visualization is a calendar. Calendar applications may show a period of time, such as a day, a work week or a calendar week, a month, etc., and during that period there may be sub-periods during which one or more appointments or activities can be displayed, allowing the calendar owner to effectively manager her or his time. Calendar applications often show time in multiple dimensions. For example, successive months can be shown as different tabs or pages. Successive weeks within a month can be shown in a vertical sequence, and successive days in a week can be shown horizontally.

In many process visualizations, time plays an important role. However, in some process visualizations time may be irrelevant, but some other grouping of process elements may have dominant relevance.

Process visualizations can be acquired as pre-developed components, usually with a limited degree of customizability, or they may be developed from scratch, offering unlimited customizability. The former option can be very time-efficient for an application or web developer, but it may not offer all required functionality. The latter option can be very time-inefficient for an application or web developer. Unfortunately, no option in-between has been available.

Embodiments of the present invention address this shortage of options, and offer a toolkit and methodologies that allow relatively fast development of an optimized visualization.

A Process Visualization Toolkit

Figure 1:
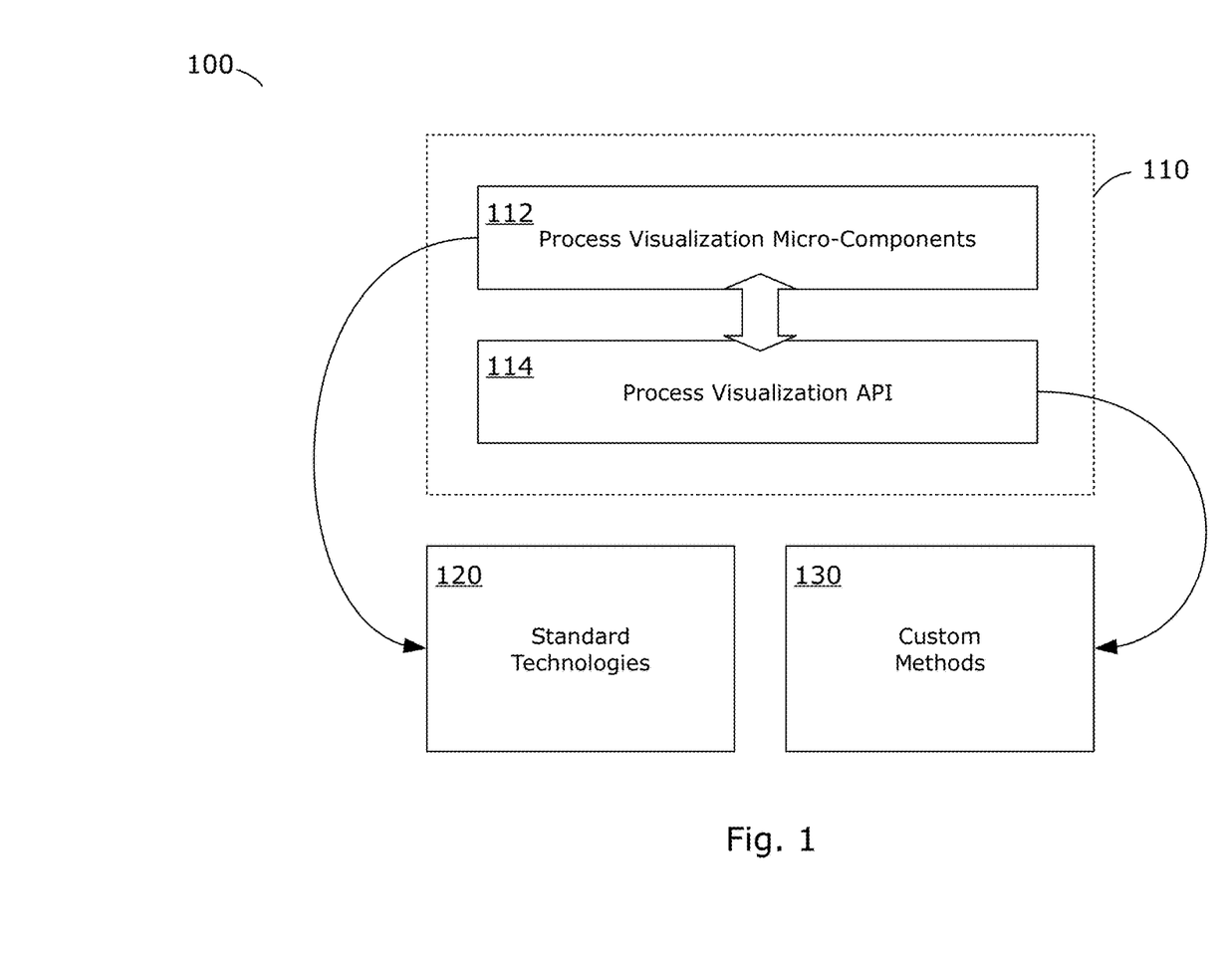
FIG. 1 illustrates an example process visualization toolkit according to an embodiment of the invention.

FIG. 1 illustrates an example process visualization toolkit 110 according to an embodiment 100 of the invention. Toolkit 110 includes one or more process visualization micro-components 112, and a process visualization application programmers' interface (API) 114. Micro-components 112 may be used alongside components in standard technologies 120 to create an unlimited range of display items. API 114 may be used in and alongside custom functions 130 to create unlimited functionality and interactivity. API 114 provides standard functionality, customizability, and interactivity. API 114 provides a developer access to properties, functions, events, signals, and slots of micro-components 112.

Micro-components 112 may include a time axis component, that may be displayed as a column header or as a row header for a process visualization that includes a block of cells, or that may be used as a horizontal header or vertical header for a process visualization that includes a continuous canvas for painting detail. Micro-components 112 may include a step header list, which may be displayed as a list of row headers or as a list of column headers for process steps to display. Micro-components 112 may further include a row micro-component or column micro-component capable of displaying a horizontal or vertical bar item whose location and length can be matched against a time axis micro-component. Micro-components 112 may also include a horizontal and/or vertical bar item that can be displayed anywhere on a continuous or non-continuous canvas. It may further include a time indicator to show the current date and/or time, and/or an indicator for a currently projected end time, or for any other time. It may include connectors to connect bar items, to display cause and effect, or to display dependencies. It may further include micro-components to display external influences acting upon activities or process elements represented by bar items, or to display influences from activities or process elements represented by bar items acting upon external processes. In general, embodiments of micro-components 112 may include any display items that are meaningful to construct a process visualization and that provide functionality, customizability, and/or interactivity. Micro-components may be suitable for different types of time: relative time, calendar time, working time. Calendar time and working time generally refer to dates. Working time may be specific to the context of a country or geographic region, where workers in different regions have different days off due to tradition, religion, and government regulations.

A micro-component may exist as a template or a software class, providing public functions, properties, events, signals and/or slots for API 114. A micro-component software class may be instantiated into an object, that can be initialized through its available properties and functions, and that can be displayed in a GUI.

Figure 2:
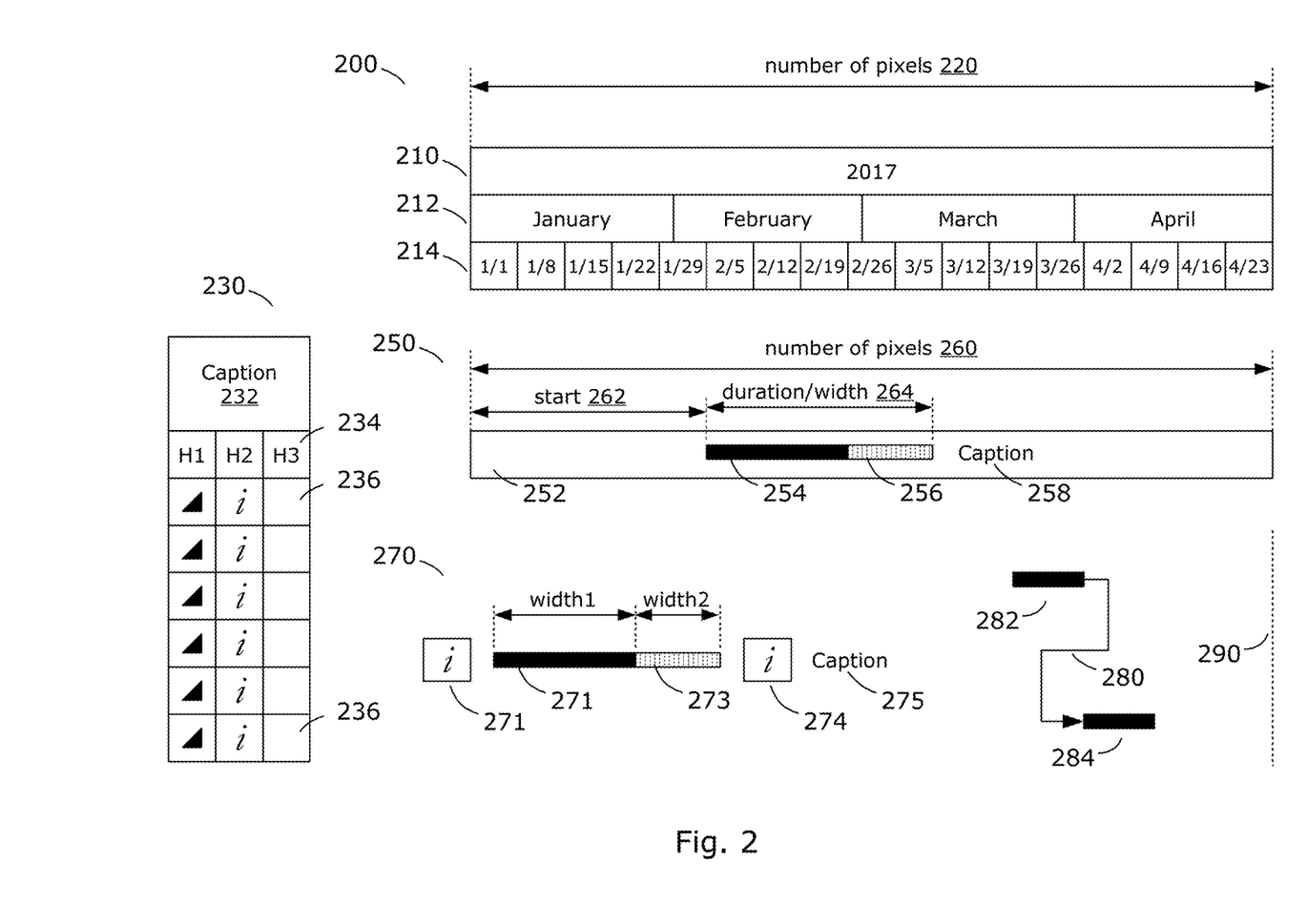
FIG. 2 illustrates example micro-components according to embodiments of the invention.

FIG. 2 illustrates example micro-components 200, 230, 250, 270, 280 and 290 according to embodiments of the invention.

Time Axis

Time axis 200 is shown as a column header, or horizontal header. Time axis 200 has a width 220, which may be expressed as a number of pixels, corresponding with a number of pixels on a computer display on which time axis 200 is or could be shown, or as any other useful scale. Similarly, time axis 200 may have a height, which may also be expressed as a number of pixels or as any other useful scale. For a horizontal time axis micro-component, as shown, width is important as it provides a scale factor for a duration of time displayed horizontally. For a vertical time axis micro-component, not shown, height is important as it provides a scale factor for a duration of time displayed vertically. Example time axis 200 includes major axis 210, displaying a portion of year 2017, medium axis 212, a sub-axis, displaying months January through April, and minor axis 214, another sub-axis, displaying weeks starting January 1 through April 23. Embodiments of a time axis may include only a major axis, or only a medium axis, or only a minor axis, or any combination of major, medium, and minor axes, and even other sub-axes with additional detail. Each axis may include one or more subdivisions displaying date information, such as year; month; week number, or a particular date within a week, such as the first or the last date of the week; day; or time within a day. Embodiments may distinguish between several time types, for example: calendar time, working time, and relative time. While calendar time would normally have 365 or 366 days in a year, working time would make some of those unavailable, for example weekend days and national holidays. Time axis subdivisions may include relative time information rather than date information. In other embodiments a time axis subdivision may display no textual time information, or line indicators of further time detail. In yet other embodiments a time axis subdivision may display other visual indicators, such as icons. A time axis has a start time and an end time, and may provide a starting offset to provide whitespace before the start time. Embodiments where not time but some other parameter is of dominant essence, the embodiment may convert the other parameter to (placeholder) time, and display textual or graphical information related to this other parameter in the time axis subdivisions.

To a developer, once instantiated and initialized, time axis 200 acts as a single displayable object with a width and a height, and other visible and non-visible properties. It includes functions that are useful for a process visualization designer. Those functions may include: calculating a bar item start position; calculating a bar item length; calculating an x- or y-coordinate of a time-related item; a position-to-time converter (generally a pixel-to-time converter); a time-to-position converter (generally a time-to-pixel converter); a (t minus x) calculator to convert a time relative to a later time to a position relative to a greater position, and vice versa; zoom in or out; pan; add, remove or move a sub-axis; and hide or show any of the major, medium, minor or other sub-axes. Time axis 200 may include properties that are useful for a process visualization designer, such as: display position, total width, total height, offset width, offset height, relevant width, relevant height, time type, start time, duration, end time, date/time format, display scale, custom labels, context menus, rendering, etc. Appendix 1 (24 pages), entitled "Class: ojTimeAxis", provides an example embodiment of a time axis micro-component, and Appendix 2 (5 pages), entitled "Class: TimeUtils", provides an example embodiment of a process visualization API related thereto. Appendices 1 and 2 provide additional details about features in different embodiments as well as details about implementing embodiments of the invention. Appendices 1 and 2 are attachments to this specification, and incorporated by reference herein for all purposes.

Step Header List

Example step header list micro-component 230 can be displayed vertically or horizontally. It is shown here displayed vertically, to provide row headers for process steps in a process visualization. Step header 230 includes caption area 232, row 234 of column headers, and rows 236 of step headers.

The vertical height of caption area 232 and column header row 234 may match the vertical height of a time axis micro-component. For example, the height of caption area 232 could equal the combined heights of major axis 210 and medium axis 212 of time axis 200, and the height of column header row 234 could equal the height of minor axis 214 of time axis 200. In this way, an embodiment may display time axis 200 adjacent to step header 230. Row micro-components may line up with (and match the height of) step header rows 236.

The caption in caption area 232 may be set as a text property. Some embodiments may allow display of an icon, and/or display of both an icon and a text in caption area 232. Column header row 234 may provide one or more column headers, determined by a number of columns property. Each column header can show a text. As displayed, the embodiment shows three columns, with header captions "H1", "H2", and "H3", respectively.

Below each column header, step header list 230 shows columns spanning all included step header rows. This way, each step header row includes fields for multiple step header items, in this case for three step header items. Each column may provide for one of several types of step header items, for example: collapse/expand buttons to allow for a hierarchical structure, icons, process step names, resources used, start and end times, dependencies, and any other information that may be relevant for a process step.

A step header list may provide interactivity, for example a user input on a collapse/expand button may generate an event or signal that a developer can use to show or hide one or more row micro-components. In embodiments, texts shown in step header items may be editable, and editing may cause events or signals that a developer can use to update step or process information.

Row or Column

Example row micro-component 250 may be displayed below a horizontal header time axis micro-component, such as time axis 200. Row 250 may include properties that are useful for a process visualization designer, such as: total width, offset width, relevant width, date or relative time, start and end date/time, time type, display scale, number of bar items shown, details of each bar item, background rendering, etc. In a process visualization toolkit, several row micro-component 250 properties match horizontal time axis micro-component 200 properties to allow a developer to work quickly and efficiently. The process visualization toolkit may further provide a column micro-component (not shown), with properties analogous to those of a row micro-component.

Row 250 includes a horizontal box 252, which may have any of its four borders (top, right, bottom, left) displayed or hidden. Horizontal box 252 provides an outline of row 250. Its width, number of pixels 260, may match the time axis 200 width: number of pixels 220. Inside horizontal box 252, row 250 may display one or more bar items. Example row 250 shows one bar item, which includes a first part 254, a second part 256 and a caption 258. Bar items may generally come in any form, as further described below with reference to bar item micro-component 270. Bar item 254-258 has a start position 262 that may be expressed as a number of pixels from the left side of horizontal box 252, or that may be expressed as a date and/or time, or as any other useful scale available in time axis 200. Similarly, it has a duration or width 264.

Bar Item

Example (horizontal) bar item micro-component 270 includes a bar that is made up of one or more portions. In this example, portions 271 and 273 are shown, but additional portions may be temporarily or permanently hidden. Each portion has a width, and rendering properties such as color, gradient, hatching, bitmap, image, or icon. Bar 271-273 has a total width that corresponds with duration in a time axis micro-component via a display scale property. Bar 271-273 may be preceded by icon 271, which if defined requires additional width and whitespace that could occupy an offset area. It may further be followed by icon 274, which if defined requires additional width and whitespace. Bar 271-273 is further followed by caption 275, which displays any text defined in its text property. Caption 275 may be separated from icon 274 or from bar portion 273 by some whitespace, a width of which may be programmable. In some embodiments, caption 275 follows icon 274, whereas in some other embodiments icon 274 follows caption 275. In yet other embodiments, there may be additional captions and/or icons.

While the bar 271-273 total width corresponds with duration, the width of each bar portion 271, 273, may or may not correspond with duration. Instead, the relative widths may represent percentages adding up to 100%, such as percentage completed for a task, or a composition of resources. Bar 271-273, or each bar portion 271, 273, may have a height, to represent a further process parameter.

Whereas bar item 270 is shown as a horizontal bar, a vertical bar item may have analogous properties.

In some embodiments, bar item 270 may hide all bar portions when its duration property is set to zero, and instead show a diamond. Diamonds are used in GANTT charts to denote milestones, which have a duration of zero.

Bar item 270 may provide interactivity. For instance, it can provide a context menu to provide access to custom process visualization functions. Embodiments may show the context menu, for example, upon a user's right mouse click. It may provide further detail, or editing capabilities, through bar item selection or activation. An embodiment may activate bar item 270, for example, upon a user double-clicking or tapping it, and fire an event or signal that the developer uses to launch a window with detail information or editing capabilities.

Connector

Example connector micro-component 280 allows connecting bar items 282 and 284 to denote a dependency. While illustrated as connecting the end of bar item 282 to the start of bar item 284 (ES), it can also connect end to end (EE), start to start (SS), and start to end (SE). Furthermore, connector 280 has a time property. As drawn, the time property has a value of zero, and bar item 284 starts immediately after the end of bar item 282. When the time property has a value of 1 year or 1 millisecond, bar item 284 cannot start until 1 year or 1 millisecond after bar item 282. When the time property has a value of −5 working days, bar item 284 starts 5 working days before the end of bar item 282. Since bar items 282 and 284 can be standalone micro-components, or included in row micro-components, connector 280 is capable of connecting bar items included in (a different and/or the same) row micro-component and connecting standalone bar items. As all micro-components, connector 280 is available in horizontal and vertical embodiments.

Connector 280 provides properties, including: input bar item identification, output bar item identification, connection type (ES, EE, SS, or SE), connection time, and time type.

Connector 280 may provide interactivity. For instance, an embodiment may show a standard dialog to edit its properties upon receiving a user's activation input, or it may fire an event or signal that a developer can use to launch a custom dialog or context menu.

Time Indicator

Time indicator micro-component 290 indicates a specific time with respect to a time axis micro-component. Time indicator 290 can be shown standalone on a painting canvas or container, and it can span multiple row or column micro-components. Its direction can be vertical or horizontal, as required. Its length can be set to span a set of rows or columns, or to match a dimension of a parent canvas or container. A time indicator may be set to match the present date or time, or to a fixed date or time. Time indicator properties may include: time type, time, fixed vs relative vs progressing, bar item dependency, rendering options, direction, span, caption, tooltip.

Performance Presentation Using a Process Visualization Toolkit

Figure 3A:
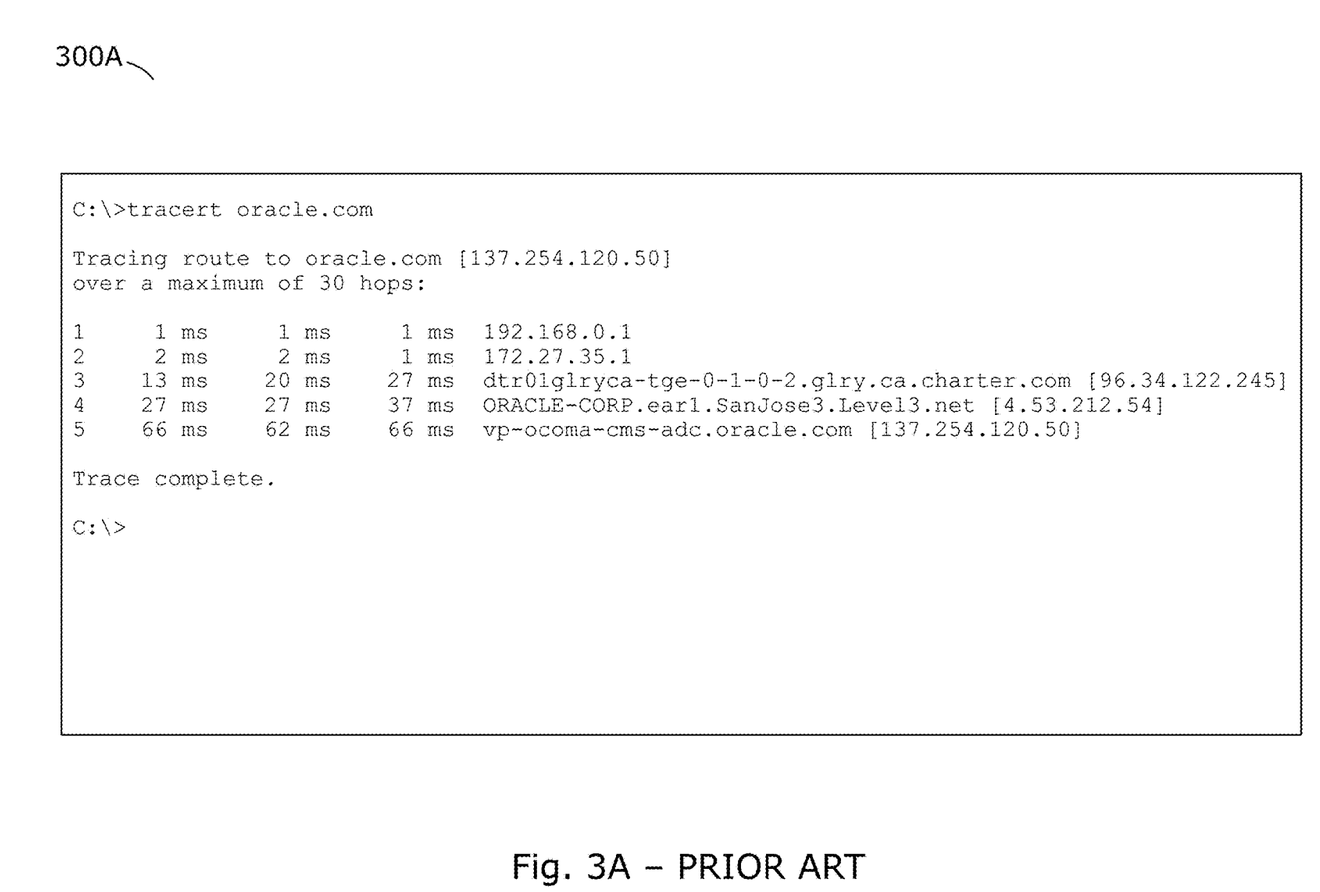
FIGS. 3A-B illustrate conventional text-based performance presentation versus presentation in a process visualization created with a toolkit according to an embodiment of the invention.
Figure 3B:
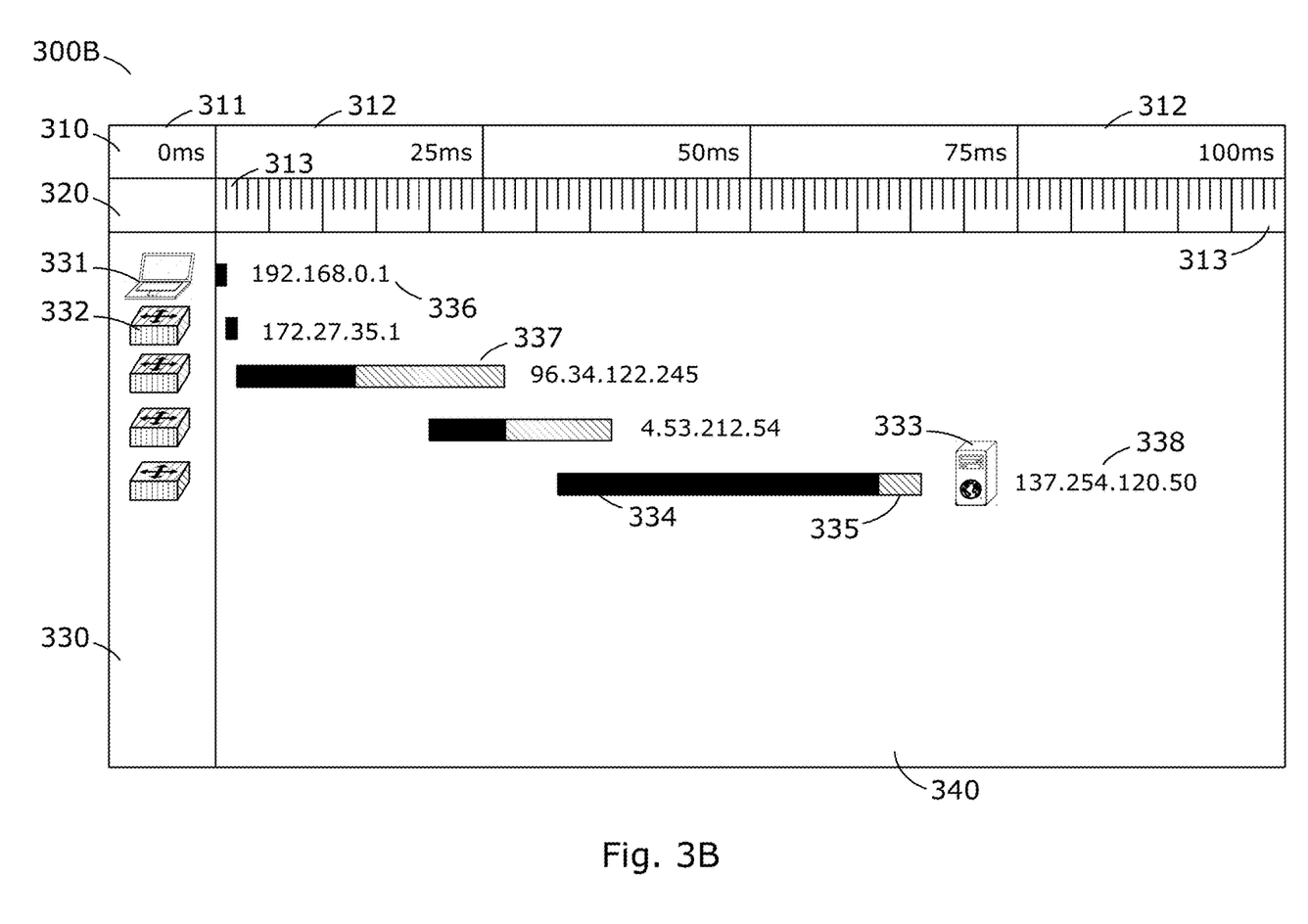

FIGS. 3A-B illustrate conventional text-based performance presentation versus presentation in a process visualization created with a toolkit according to an embodiment of the invention. FIG. 3A shows a conventional performance presentation 300A in a terminal window, or on a computer display without a GUI. Text interfaces are still popular with information technology professionals because they don't depend on the availability of a GUI. However, when a GUI is available, graphical applications may work more conveniently. Example 300A shows the simplified performance of internet and local networks, when contacting a server at oracle.com from a computer somewhere in Silicon Valley. It uses a utility called traceroute, available in Microsoft Windows as tracert. It traces the route an internet protocol (IP) packet takes from a first computer in a network to a second computer, traversing successive connections (hops) between the first computer, intermediate routers, and the second computer. Traceroute measures the roundtrip time for three packets sent from the first computer to each of the intermediate routers and to the second computer. In this case, traceroute shows four intermediate routers and the second computer, the server at Oracle with IP address 137.254.120.50. The first intermediate router, with IP address 192.168.0.1 is a router in the local network to which the first computer is connected. Since for every hop three measurements are made, the presentation gives an impression of the variability of the results, and the consistency of each hop.

FIG. 3B shows an example process visualization 300B that could be built with a visualization toolkit according to an embodiment of the invention. It shows a different perspective of the results in FIG. 3A. Time axis 310-320 shows relative time, rather than calendar based time. Below time axis 310-320, visualization 300B includes first area 330 and second area 340. First area 330 shows icons representing the first computer 331 and the four intermediate routers. First area 330 is displayed below an offset area 311 in time axis 310-320.

Time axis 310-320 is instantiated from a time axis micro-component class. It includes major axis 310 and minor axis 320, each starting with an offset area. Major axis 310 includes subdivisions 312 each representing a time span of 25 milliseconds and having a text label ("25 ms", "50 ms", etc.). Minor axis 320 includes subdivisions 313 each representing a time span of 5 milliseconds, without text label, but including line indicators to give a visual resolution of 1 millisecond.

In a row next to first computer icon 331, embodiments display a first bar item, with caption 336 displaying an IP address (192.168.0.1) of the first intermediate router. The first bar item has a duration (width) of 1 ms, and a start position at 0 ms. The first bar item represents the performance of the first hop. A second row, next to first intermediate router icon 332 shows a second bar item with a caption, an IP address of the second intermediate router. The second bar item starts at 1 ms and has a duration (width) of 1 ms. It represents the performance of the second hop. A third row shows third bar item 337, representing the third hop. Third bar item 337 shows both a minimum and maximum duration for the performance of the third hop. It starts at 2 ms and has an earliest measured end at 13 ms and a latest measured end at 27 ms. By virtue of using two different renderings for bar item 337, embodiments clarify the variability of measurements of the third hop. A fourth row shows a fourth bar item representing the performance of the fourth hop, and a fifth row shows a fifth bar item 333-338, representing the performance of the final hop. The fifth bar item shows icon 333 representing the second computer, i.e. the server at oracle.com, and caption 338 with the server's IP address 137.254.120.50. The fourth and fifth bar items do not start where their predecessors left off, as their predecessors (the third and fourth bar items, respectively) have variability themselves. Instead, the example embodiment shown in FIG. 3B starts them at the average measured ends of the predecessors. Alternatively, they could have been shown to start at the median, earliest, or latest measured ends. The variability shown in the third through fifth bar items shows the variability actually measured.

Second area 340 may provide further functionality. For instance, it may include several background colors, shown side by side, to represent which routers are inside a local area network in which the first computer resides; which routers are on internet; and which routers are inside a local network in which the second computer resides. This functionality could be included in a canvas included in or including second area 340, and it could be included in row micro-components.

Visualization 300B may have built-in interactivity. For instance, gesture inputs such as horizontal or vertical pinch and stretch on time axis 310-320 or on row micro-components can be used for horizontal or vertical zoom-in and zoom-out. Double-clicking or tapping a bar item can be used for displaying a pop-up window with additional information about the performance of the hop. Double-clicking or tapping an icon in first area 330 can be used for displaying a pop-up window with additional information about the machine or router represented. Right-clicking an icon or a bar item can be used for displaying a context menu with additional functionality.

First area 330 may be built from scratch, or it may use a step header list micro-component. In the latter case, time axis 310-330 does not need an offset area 311, but an embodiment can rather use the step header list's caption area to line up with major axis 310, whereas its column header row can line up with minor axis 320. Only one column is used, and each of the step headers is displaying only an icon (331, 332, . . . ).

Second area 340 may be built in three different ways. In a first embodiment, it may be built with row micro-components, as in FIG. 2, item 250; in a second embodiment, it may be built with bar item micro-components, as in FIG. 2, item 270; and in a third embodiment it may be built from scratch with standard technology, for example hypertext markup language (HTML), wherein HTML object rendering options may be determined by one or more cascaded stylesheets (CSS).

First Embodiment

In the first embodiment of second area 340, second area 340 includes multiple row micro-components, left-aligning with a start time (0 ms) of time axis 310-320, and right-aligning with an end time (100 ms) of time axis 310-320. Borders could be painted either on second area 340 or on the multiple row micro-components, or any combination of the two. Second area 340 may be a section of a larger container that includes the whole process visualization 300B, or that includes first area 330 and second area 340, or it may be a container that includes just the multiple row micro-components and any whitespace, for example, in-between and/or following the multiple row micro-components.

Second Embodiment

In the second embodiment of second area 340, second area 340 includes multiple bar item micro-components, whose horizontal locations and bar lengths are aligned with applicable start and stop times of time axis 310-320. The second embodiment may calculate the multiple bar item horizontal locations and lengths using the time axis 310-320 functions for calculating a bar item's start position and length. Borders could be painted on second area 340. Second area 340 may be a section of a larger container that includes the whole process visualization 300B, or that includes first area 330 and second area 340, or it may be a container that includes just the multiple bar item micro-components and any whitespace around these.

Third Embodiment

In the third embodiment of second area 340, second area 340 includes no micro-components. A developer constructs bars from basic building blocks, such as <div> elements in HTML, whose rendering she determines using a CSS stylesheet or the like, or she may paint the bars directly onto a canvas included in or including second area 340. Similarly, she may create captions from basic building blocks such as text labels or <div> elements, or she may write directly onto the canvas. She may include icon 333 in an HTML <img> element, or paint it directly onto the canvas. The third embodiment may calculate horizontal positions and lengths of the <div> and/or other graphical and text elements using the time axis 310-320 functions for calculating a bar item start position and length.

Variations

Although process visualization 300B provides an example with a horizontal time axis 310-320 and a left-to-right convention for the passage of time, alternative embodiments may follow a right-to-left convention for the passage of time, or include a vertical time axis with a top-to-bottom convention or bottom-to-top convention. Embodiments may hide captions, or provide other information than IP numbers or additional information, for example statistical parameters or hop reliability information. Embodiments may show no icons, or additional icons, or icons in different locations. Embodiments may show icons or components that provide access to additional functionality. Whereas process visualization 300B shows time axis 310-320 as a horizontal header, other embodiments may show the time axis, or additional time axes, in any different place in the process visualization to create an unconventional layout. For example, an embodiment can place a first time axis with a first timescale in the first row of a layout, and a second time axis with a second timescale in the last, or the lowest visible, row of the layout. Alternatively, an embodiment can place a time axis just at the bottom, or in the middle of a visual area of the process visualization.

GANTT Chart Using a Process Visualization Toolkit

Figure 4:
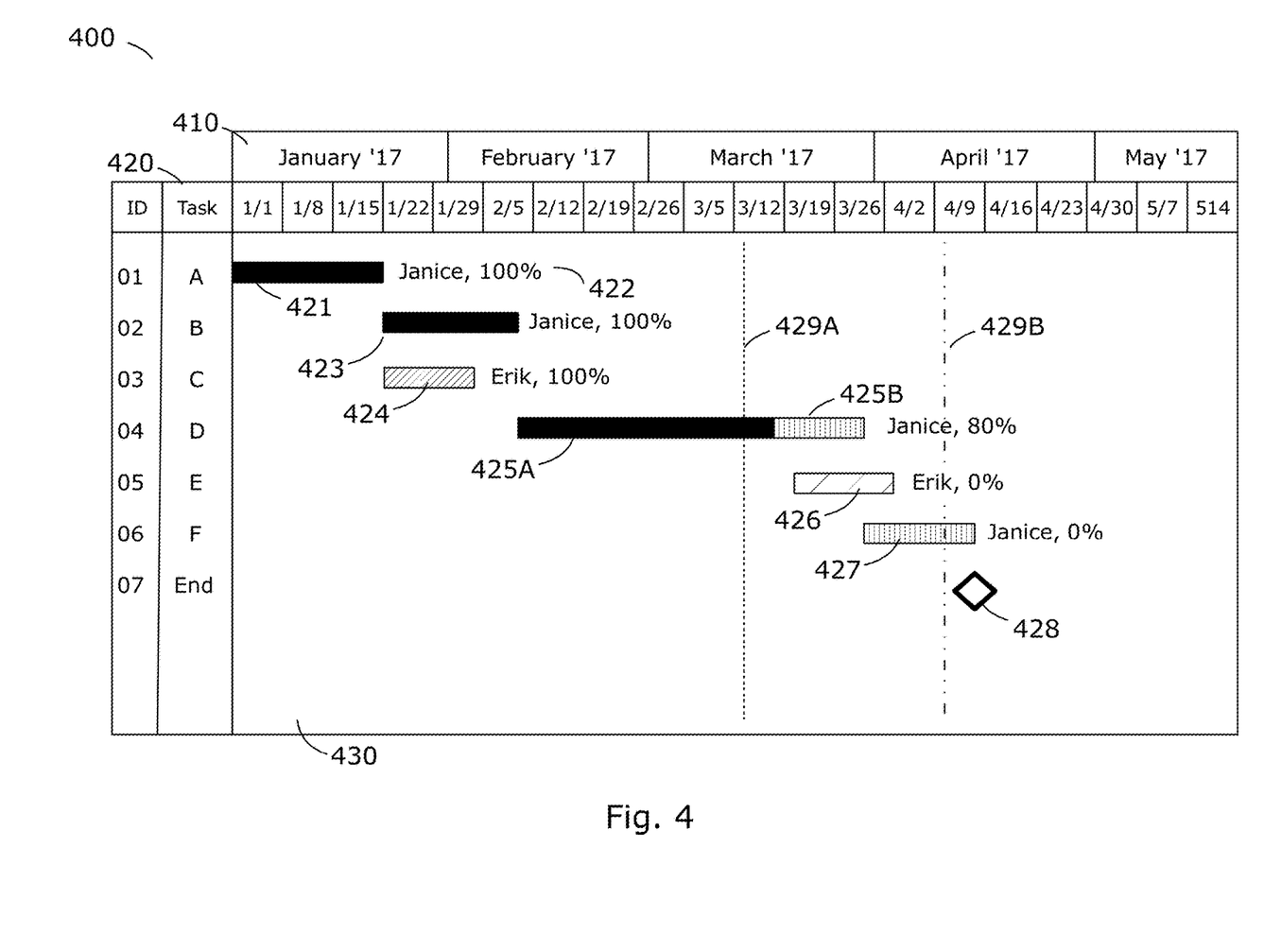
FIG. 4 illustrates a GANTT chart that may be created with a toolkit according to an embodiment of the invention.

FIG. 4 illustrates a GANTT chart 400 that may be created with a toolkit according to an embodiment of the invention. GANTT chart 400 includes time axis micro-component 410, task panel 420, and visual area 430. Task panel 420 may be implemented with a step header list micro-component, and visual area 430 may be implemented with row micro-components. Line 429A, representing the current date, may be implemented with a time indicator micro-component. Line 429B, representing a currently forecast date for achieving milestone 428, may also be implemented with a time indicator.

The embodiment in FIG. 4 shows time axis 410 including a major axis with month and year labels, and a minor axis with weeks, labeled with their start dates. Time axis 410 may provide interactivity upon receiving user inputs, including zooming, panning, date format changes, rendering options, and showing a context menu. Embodiments may use user inputs that are common in the art and that are intuitively right for invoking these functions, dependent on the type of device used, the type of display, and the types of user input devices available to the user. Upon receiving a user input, time axis 410 will fire the applicable event or signal that can be received to invoke an interactive function, which may either be included in the micro-component's API or be a custom version added by a developer.

Embodiments may implement task panel 420 with a step header list micro-component. Task panel 420 shows an un-nested list of 6 tasks with ID 01 through 06 and label "A" through "F", ending in a milestone with ID 07 and label "End". The list is presented in a table with two columns, with captions "ID" and "Task", respectively. A step header list micro-component may directly implement the table. Conversely, a developer may decide to use conventional technology, and implement the table from scratch in HTML, or implement the table with a table widget in another technology. A step header list micro-component may provide all functionality, adaptability, and interactivity as described earlier in the section "Step Header List". A standard widget may provide standard table functions, and a development from scratch may provide unlimited functionality, adaptability, and interactivity.

Visual area 430 shows bars 421, 423-424, 425A-B, and 426-427, representing tasks 01-06, and diamond 428 representing milestone 07. Bars 421, 423, 425A-B and 427 are in the critical path for achieving milestone 07, represented by diamond 428. The embodiment uses solid black for bars that represent completed critical path tasks, i.e. bars 421, 423, and 425A. It uses vertical hashing for bars that represent uncompleted critical path tasks, i.e. bars 425B and 427. It uses dense 45-degree hatching for tasks that are completed but not in the critical path, i.e. bar 424, and wide 45-degree hatching for tasks that are not completed and not in the critical path, i.e. bar 426. Captions, such as 422, indicate resources allocated to a task, in this case a person named Janice, and, redundantly, the percentage complete for the task.

Embodiments may implement visual area 430 using multiple row micro-components as described in the section "Row or Column", and time indicators as described in the section "Time Indicator". The row micro-components allow for very easy overall layout, as their display scales, start and end times, and other parameters relevant to display, can all be matched with those of time axis 410, and, if applicable, a step header list micro-component used in task panel 420. Similarly, embodiments using time indicator micro-components for lines 429A-B will be very easy to lay out and customize, as their parameters may directly be matched with those of the other used micro-component(s).

Alternatively, embodiments may implement visual area 430 with bar item micro-components as described in the section "Bar Item". While bar item micro-components offer many but not necessarily all advantages of a row micro-component, a developer will be able to create a canvas or container from scratch to implement the backdrop of visual area 430, and provide unlimited functionality, adaptability, and interactivity for the canvas or container.

Yet alternatively, embodiments may implement visual area 430 totally from scratch. Those embodiments may still benefit from the advantages of using time axis and step header list micro-components, and offer unlimited functionality, adaptability, and interactivity for the canvas or container, as well as for bars, icons, lines, and other elements.

Method to Create a Visualization

Figure 5:
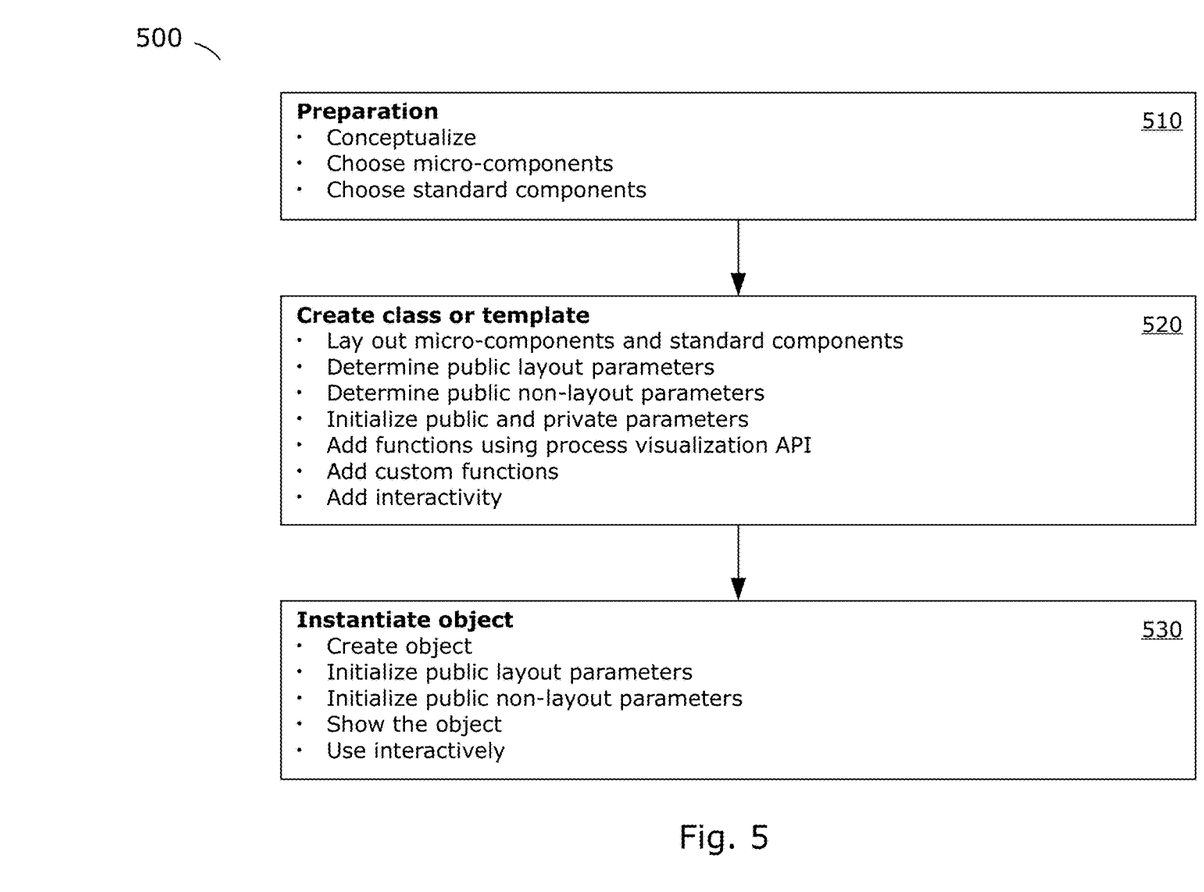
FIG. 5 illustrates an example method to create and use a process visualization using a process visualization toolkit according to an embodiment of the invention.

FIG. 5 illustrates an example method 500 to create and use a process visualization using a process visualization toolkit according to an embodiment of the invention. Method 500 includes major steps 510 (preparing), 520 (creating a class or template), and 530 (instantiating an object).

Step 510, preparing, includes the sub-steps of conceptualizing, choosing micro-components, and choosing standard components.

A developer determines which micro-components provide sufficient customizability to meet visual requirements and sufficient functionality to meet other requirements. He or she determines if those micro-components provide sufficient events or signals to meet interactivity requirements that may not be built in. Based on the determination, the developer selects micro-components for some parts of the process visualization, and standard components or technology for the remaining parts.

Step 520, creating a class or template, includes the sub-steps of laying out micro-components and standard components, determining public and private layout parameters, determining public and private non-layout parameters, initializing public and private parameters, adding methods using the process visualization API for the selected micro-components, adding custom methods, and adding interactivity.

To create a class, the developer defines the class in a computer text file, and imports the selected micro-components and standard components to make them available to the class. In the class, he or she defines a default layout using the selected micro-components and standard components, and defines public and publicly accessible private parameters that allow for adapting the layout. He or she initializes, for example in a class constructor, the public and publicly accessible private layout parameters to match the default layout, and applies these layout parameters to the selected micro-components and standard components. He or she initializes, for example in the class constructor, public and private non-layout parameters to default values. The developer adds or uses functions that are available in the process visualization API (for the selected micro-components), as well as custom functions for non-standard functionality. Using available events or signals, or defining new ones where missing, the developer adds interactivity to the selected micro-components and standard components.

Method 500 comprises a mix of standard technology and technology according to embodiments of the invention. Many standard technologies are available to a developer. In case a developer wishes to create the process visualization in HTML, he or she may create the class in JavaScript (and later instantiate the process visualization object by running the JavaScript in the HTML). The class may comprise HTML objects, both from the standard technology as well as from the micro-component. An example HTML object is the <div> element, which can be customized by a CSS stylesheet, and whose appearance is therefore fully in control of the developer.

To create a template, the developer has the option of using HTML to define a layout. For example, the developer may create a 2×2 HTML table, and instantiate a time axis micro-component in the first row, second cell; a step list header micro-component in the first column, second cell, and a sub-column of row micro-components in the second column, second cell.

HTML with cascaded stylesheets (CSS) and JavaScript is only one of many technologies with which embodiments of the invention can work. Alternatives include Java with NetBeans, C++ with Qt or wxWidgets, C# with XAML, etc.

The reason that embodiments of the invention save the developer time is that the various micro-components can share parameters such as start and end time, display scale, rendering, time types, text styles, etc. In addition, the time axis micro-component provides functions to convert between the selected time type and a number of pixels, to make working with standard technologies convenient.

Step 530, instantiating an object from the created class or objects from the selected standard and micro-components, includes the sub-steps of creating the object, initializing the publicly accessible layout parameters and the publicly accessible non-layout parameters, showing the object(s), and using it (them) interactively. Embodiments may use data binding to couple instantiations with actual HTML elements and make them visible to a user.

Figure 6:
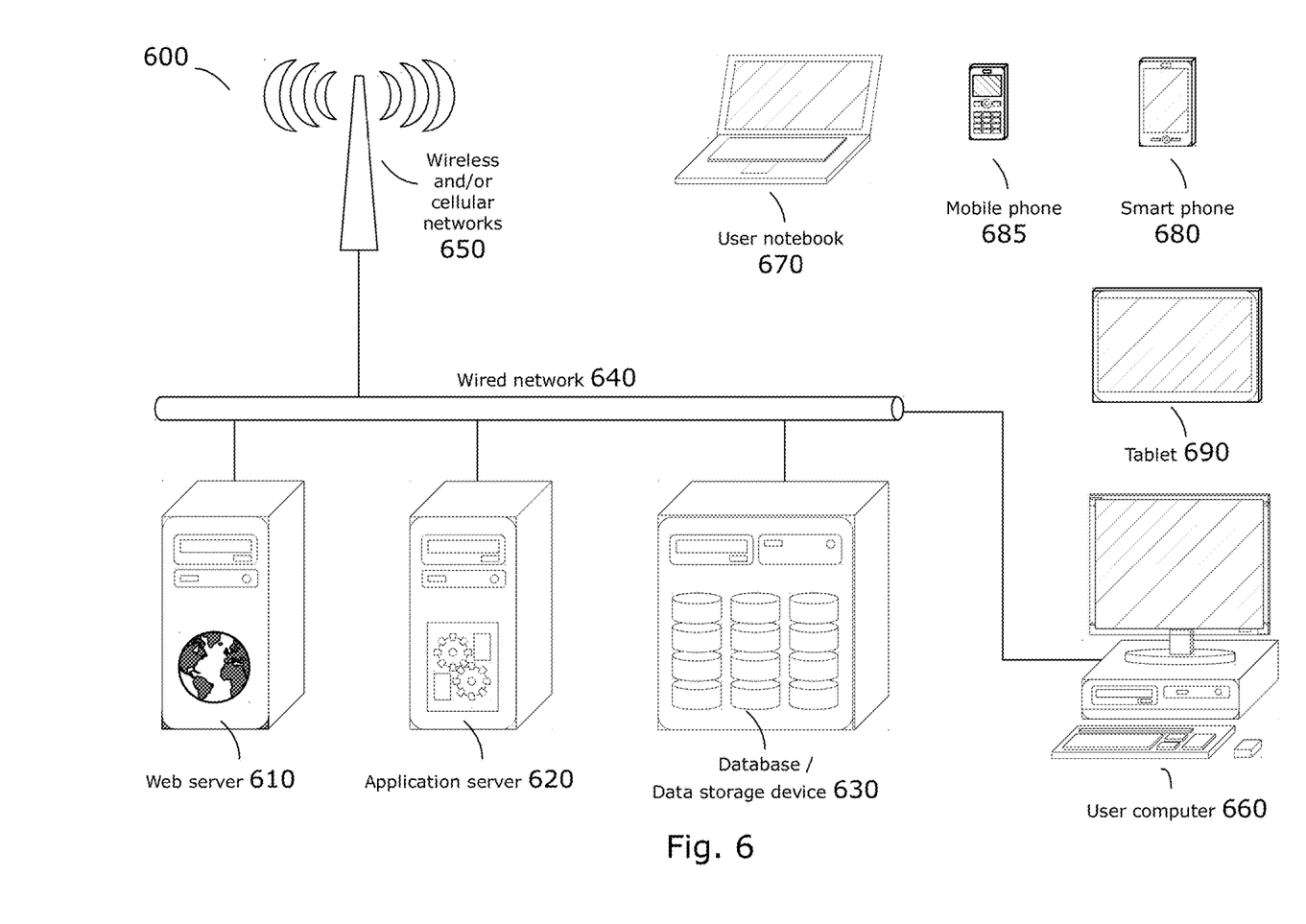
FIG. 6 illustrates an example system suitable for implementing embodiments of the invention.

FIG. 6 illustrates a system suitable for implementing embodiments of the invention. FIG. 6 shows an example computer and network system architecture 600 suitable for implementing embodiments of the invention. The system includes user desktop computer 660, notebook computer 670, mobile phone 685, smart phone 680, and tablet 690. The system can interface with any type of electronic device, such as a thin-client computer, internet-enabled mobile telephone, mobile internet access device, tablet, electronic book, or personal digital assistant, capable of displaying and navigating web pages or other types of electronic documents. Although the system is shown with five user computers, any number of user computers can be supported. The user computers 660-690 and other electronic devices can act as client systems using host servers included in system 600.

A web server 610 is used to process requests from web browsers and standalone applications for web pages, electronic documents, enterprise data or other content, and other data from the user computers. The server 610 may also provide a menu application, as well as syndicated content, such as RSS or Atom feeds, of data related to enterprise operations.

Application server 620 operates one or more mobile applications. The mobile applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 620 process input data and user computer requests and can store or retrieve data from database 630. Database 630 stores data created and used by the data applications. In an embodiment, the database 630 is a relational database, such as MySQL, that is adapted to store, update, and retrieve data in response to SQL format commands. In other embodiments, unstructured data storage architectures and NoSQL databases may also be used.

In an embodiment, the application server 620 is one or more general-purpose computers capable of executing programs or scripts. In an embodiment, the web server 610 is implemented as an application running on one or more general-purpose computers. The web server and application server may be combined and executed on the same computers.

An electronic communication network enables communication between user computers 660-690, web server 610, application server 620, and database 630. In an embodiment, the electronic communication network may further include any form of electrical or optical communication devices, including wireless 640 and wired 650 networks. The electronic communication network may also incorporate one or more local-area networks, such as an Ethernet network; wide-area networks, such as internet and cellular carrier data networks; and virtual networks, such as a virtual private network.

The system is one example for executing mobile applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. Embodiments comprise both methods, the process visualization toolkit, process visualization micro-components and their APIs, and charts created with the process visualization toolkit. Seamless interfacing with standard technologies comprises a part of the invention, as is the capability to receive user inputs and function interactively. Examples have focused on two-dimensional charts, but embodiments of the invention can also create charts with fewer or more dimensions, or with nested dimensions. Whereas bar items are generally depicted horizontally, embodiments allow depicting them in any other direction. The same holds for time axes and other micro-components.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for creating a process visualization for display in a graphical user interface (GUI) on a computer's screen, using a process visualization toolkit installed on the computer, wherein the toolkit comprises:
   (a) five or more process visualization micro-component templates, including configurable templates for at least (1) a time axis; (2) a step header list; (3) a row; (4) a column; and (5) a bar item; each micro-component template comprising:
      a first display size property, denoting a display size in a first direction;
      a second display size property, denoting a display size in a second direction;
      a display scale property, denoting a ratio between the display size in the first direction and a time duration;
      a start time property;
      a time duration property;
      a time type property to indicate a selection of an available time type;
      a display position property; and
      one or more shapes to be displayed in the GUI; and
   (b) an application programmer's interface (API) for each micro-component, comprising functions to:
      show the micro-component;
      customize rendering of the one or more shapes;
      update displayed information; and
      fire at least one of an event and a signal upon receiving a user input;
   and wherein the method comprises:
   (a) selecting a first micro-component from the toolkit;
   (b) creating a class, wherein creating the class defines a process visualization default layout by:
      (1) importing the first micro-component;
      (2) defining public layout parameters and public non-layout parameters; and
      (3) defining default values for layout parameters including position-related properties;

(c) instantiating an object from the created class by creating an object including the class, and initializing the public layout parameters including position-related properties and public non-layout parameters to the default values to create the process visualization default layout;

(d) using the respective API for the first micro-component to:
(1) add a further function to the process visualization that is available in the API; and
(2) add a further custom function to the process visualization (e) initializing at least a portion of the public layout parameters including position-related properties and of the public non-layout parameters to non-default values;

(f) initializing the time type, start time, and time duration properties; and (g) showing the object in the GUI.

2. The method of claim 1, wherein the template is a class.

3. The method of claim 1, wherein available time types include relative time, calendar time, and working time.

4. The method of claim 1, further comprising adding an interactive function and, upon receiving a user input, using the interactive function.

5. The method of claim 1, wherein the time axis micro-component template includes a property for a time format.

6. The method of claim 5, comprising an API function for the time axis micro-component template to convert a position to a time, based on a value of the time type and display scale properties.

7. The method of claim 6, wherein the time and position are relative to a later time and greater position.

8. The method of claim 1, comprising an API function for the time axis micro-component template to convert a time to a position, based on a value of the time type and display scale properties.

9. The method of claim 8, wherein the time and position are relative to a later time and greater position.

10. The method of claim 1, wherein the bar item micro-component is capable of graphically displaying at least one percentage and capable of displaying a caption.

11. The method of claim 1, wherein the process visualization default layout includes an HTML object.

12. The method of claim 11, wherein HTML object rendering options are determined by a CSS stylesheet.

13. The method of claim 1, wherein the custom function includes JavaScript.

14. A tangible, non-transitory computer-readable information storage medium including:
(a) a toolkit with five or more process visualization micro-component templates, including configurable templates for at least (1) a time axis; (2) a step header list; (3) a row; (4) a column; and (5) a bar item; each micro-component template comprising:
a first display size property, denoting a display size in a first direction;
a second display size property, denoting a display size in a second direction;
a display scale property, denoting a ratio between the display size in the first direction and a time duration;
a start time property;
a time duration property;
a time type property to indicate a selection of an available time type;
a display position property; and
one or more shapes to be displayed in a graphical user interface (GUI) on a computer screen;

(b) an application programmer's interface (API) for each micro-component, comprising functions to:
show the micro-component in a GUI;
customize rendering of the one or more shapes;
update displayed information; and
fire at least one of an event and a signal upon receiving a user input; and (c) instructions adapted to direct a computer to display a GUI, the instructions comprising:
retrieving process data;
retrieving a class including a first micro-component selected from the toolkit, and including user-defined public and publicly accessible private parameters to adapt a process visualization layout, and including user-defined default parameter values;
creating an object including the class and initializing public layout parameters including position-related properties and public non-layout parameters to the default parameter values to create a process visualization default layout;
using the respective API for a micro-component to (1) add a further function to the object that is available in the API; and (2) add a further custom function to the object;
initializing at least a portion of public layout parameters including position-related properties and of public non-layout parameters to non-default values;
initializing object time type, start time, and time duration properties based on the retrieved process data; and
showing the object in the GUI.

15. A system comprising:
(a) a client system including a graphical user interface (GUI);
(b) a database storing process data; and
(c) a web server connected with the database and the client system via at least one network, the web server storing:
(1) a toolkit with five or more process visualization micro-component templates, including configurable templates for at least (1) a time axis; (2) a step header list; (3) a row; (4) a column; and (5) a bar item; each micro-component template comprising:
a first display size property, denoting a display size in a first direction;
a second display size property, denoting a display size in a second direction;
a display scale property, denoting a ratio between the display size in the first direction and a time duration;
a start time property;
a time duration property;
a time type property to indicate a selection of an available time type;
a display position property; and
one or more shapes to be displayed in the GUI; and
(2) an application programmer's interface (API) for each micro-component, comprising functions to:
show the micro-component;
customize rendering of the one or more shapes;
update displayed information; and
fire at least one of an event and a signal upon receiving a user input;
wherein the web server is adapted to:
(i) retrieve the process data from the database;
(ii) execute instructions to perform a method, comprising:
retrieving a class including a first micro-component selected from the toolkit, and including user-defined public and publicly accessible private parameters to adapt the process visualization layout, and including user-defined default parameter values;

creating an object including the class and initializing public layout parameters including position-related properties and public non-layout parameters to the default parameter values to create a process visualization default layout;

using the respective API for a micro-component to (1) add a further function to the object that is available in the API; and (2) add a further custom function to the object;

initializing at least a portion of public layout-related and position-related properties and of public non-layout parameters to non-default values;

initializing object time type, start time, and time duration properties based on the retrieved process data; and sending the object to the client system;

and wherein the client system is configured to show the object in the GUI.

* * * * *

UNITED STATES PATENT AND TRADEMARK OFFICE
CERTIFICATE OF CORRECTION

PATENT NO. : 10,289,388 B2
APPLICATION NO. : 15/199546
DATED : May 14, 2019
INVENTOR(S) : van den Broek et al.

Page 1 of 1

It is certified that error appears in the above-identified patent and that said Letters Patent is hereby corrected as shown below:

In the Drawings

On sheet 2 of 7, in Fig. 2, under width1, Line 14, delete reference numeral "271" and insert -- 272 --, therefor.

In the Specification

In Column 12, Line 27, after "described" insert -- above --.

In Column 12, Line 28, after "described" insert -- above --.

In Column 12, Line 39, after "described" insert -- above --.

Signed and Sealed this
Twenty-first Day of July, 2020

Andrei Iancu
*Director of the United States Patent and Trademark Office*